(12) United States Patent
Pramanick et al.

(10) Patent No.: US 11,487,577 B2
(45) Date of Patent: Nov. 1, 2022

(54) ROBOTIC TASK PLANNING FOR COMPLEX TASK INSTRUCTIONS IN NATURAL LANGUAGE

(71) Applicant: Tata Consultancy Services Limited, Mumbai (IN)

(72) Inventors: Pradip Pramanick, Kolkata (IN); Hrishav Bakul Barua, Kolkata (IN); Chayan Sarkar, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 200 days.

(21) Appl. No.: 17/007,391

(22) Filed: Aug. 31, 2020

(65) Prior Publication Data
US 2021/0232121 A1 Jul. 29, 2021

(30) Foreign Application Priority Data
Jan. 29, 2020 (IN) .............................. 202021004024

(51) Int. Cl.
*G06F 9/48* (2006.01)
*G06F 9/50* (2006.01)
(Continued)

(52) U.S. Cl.
CPC ............ *G06F 9/4881* (2013.01); *B25J 9/163* (2013.01); *B25J 9/1628* (2013.01); *B25J 9/1658* (2013.01);
(Continued)

(58) Field of Classification Search
CPC .......... G06F 9/50; G06F 40/211; G06F 40/30; G06F 9/48; G06F 9/4806; G06F 9/4843; G06F 9/4881; G05B 2219/40113; G05B 2219/4155; B25J 9/1658; B25J 9/1628; B25J 9/163
See application file for complete search history.

(56) References Cited

U.S. PATENT DOCUMENTS

| 10,007,550 | B2 * | 6/2018 | Gehin | .................... G06Q 10/06 |
| 2021/0239869 | A1 * | 8/2021 | Beam | .................... G06F 9/5061 |

FOREIGN PATENT DOCUMENTS

CN 106705974 A 5/2017

OTHER PUBLICATIONS

Yuan et al, "Autonomous Planning of Service Robot Based on Natural Language Tasks in Intelligent Space", 2017, IEEE, pp. 5437-5442 (Year: 2017).*

(Continued)

*Primary Examiner* — Charles M Swift
(74) *Attorney, Agent, or Firm* — Finnegan, Henderson, Farabow, Garrett & Dunner LLP (57) ABSTRACT

This disclosure provides systems and methods for robotic task planning when a complex task instruction is provided in natural language. Conventionally robotic task planning relies on a single task or multiple independent or serialized tasks in the task instruction. Alternatively, constraints on space of linguistic variations, ambiguity and complexity of the language may be imposed. In the present disclosure, firstly dependencies between multiple tasks are identified. The tasks are then ordered such that a dependent task is always scheduled for planning after a task it is dependent upon. Moreover, repeated tasks are masked. Thus, resolving task dependencies and ordering dependencies, a complex instruction with multiple interdependent tasks in natural language facilitates generation of a viable task execution plan. Systems and methods of the present disclosure finds application in human-robot interactions.

14 Claims, 3 Drawing Sheets

(51) Int. Cl.
    *B25J 9/16*         (2006.01)
    *G05B 19/4155*    (2006.01)

(52) U.S. Cl.
    CPC ........... *G05B 19/4155* (2013.01); *G06F 9/48* (2013.01); *G06F 9/4806* (2013.01); *G06F 9/4843* (2013.01); *G06F 9/50* (2013.01); *G05B 2219/40113* (2013.01)

(56) References Cited

OTHER PUBLICATIONS

Tenorth et al, "Understanding and Executing Instructions for Everyday Manipulation Tasks from the World Wide Web", 2010 IEEE International Conference on Robotics and Automation, May 3-8, 2010, IEEE, pp. 1486-1491 (Year: 2010).*

Dipendra K. Misra et al., "Tell Me Dave: Context-Sensitive Grounding of Natural Language to Manipulation Instructions", *The International Journal of Robotics Research*, Nov. 2015, Volume-issue Nos. 35(1-3), SAGE Publications.

Steven D. Klee, "Interactive Language-Based Task Library Instruction and Management for Single and Multiple Robots", Jun. 2015, pp. 66, CMU-CS-15-114, Publisher: Carnegie Mellon University.

Thomas M. Howard et al., "A Natural Language Planner Interface for Mobile Manipulators", 2014 IEEE International Conference on Robotics and Automation (ICRA), May 31-Jun. 7, 2014, Publisher: IEEE.

Daniel NYGA, "Interpretation of Natural-language Robot Instructions," Oct. 4, 2017, pp. 258, University of Bremen.

\* cited by examiner

ROBOTIC TASK PLANNING FOR COMPLEX TASK INSTRUCTIONS IN NATURAL LANGUAGE

PRIORITY CLAIM

This U.S. patent application claims priority under 35 U.S.C. § 119 to: Indian Patent Application No. 20201004024, filed on 29 Jan. 2020. The entire contents of the aforementioned application are incorporated herein by reference.

TECHNICAL FIELD

The disclosure herein generally relates to human-robot interaction (HRI), and, more particularly, to systems and methods for robotic task planning for complex task instructions in natural language.

BACKGROUND

As the number of robots in our daily surroundings like home, office, restaurants, factory floors, etc. are increasing rapidly, development of natural human-robot interaction mechanism becomes more vital as it dictates usability and acceptability of the robots. One of the valued features of such a cohabitant robot is that they perform tasks that are instructed in natural language. However, it is not trivial to execute the human intended tasks as natural language expression can have large linguistic variations. Existing works either assume a single task instruction given to the robot at a time or multiple independent or serialized tasks given in an instruction to the robot. However, in a practical scenario, typically instructions are composed of multiple inter-dependent tasks in natural language. For interactive task learning, usage of complex instructions has been explored but assuming structured or constrained language specifications.

A robot's capability to understand natural language instructions is limited by many factors such as the inability to understand flow of actions and their effects in a complex set of instructions (such as having conditional statements/sentences in instructions). A predominant approach includes understanding the task and its arguments from a parsed semantic representation, followed by mapping actions to world state, planning using post-conditions or using rich knowledge bases that includes task decomposition information.

Existing approaches that understand and generate task plan from complex instructions while allowing natural language use rule-based parsers which cannot handle linguistic variations. Other approaches embed planning for multiple tasks in end-to-end training. However, such direct training with task plans are environment specific and does not generalize to new situations and significant annotation effort is required to introduce a new task.

SUMMARY

Embodiments of the present disclosure present technological improvements as solutions to one or more of the above-mentioned technical problems recognized by the inventors in conventional systems.

In an aspect, there is provided a processor implemented method for robotic task planning for a complex instruction in natural language to execute an intended task, the method comprising the steps of: receiving, via one or more hardware processors, a set of tokens $I=\{w_1, w_2, \ldots w_n\}$ representative of tasks in an original task sequence $w_{1:n}$, present in the complex instruction and a set of task type labels $T=\{t_1, t_2, \ldots t_n\}$ in a task type label sequence $t_{1:m}$, wherein each of the tasks is associated with (i) a corresponding task type label in the set of task type labels T and (ii) one or more arguments that are grounded to objects, locations and states of the objects in an environment of a robot performing the tasks; predicting, via the one or more hardware processors, a set of task dependency labels $D=\{d_1, d_2, \ldots d_m\}$ in a task dependency label sequence $d_{1:m}$ corresponding to the task type label sequence $t_{1:m}$ using a pre-trained Conditional Random Field (CRF) model; and generating, via the one or more hardware processors, a Conditional Planning Tree (CPT) with a resolved task sequence by modifying the original task sequence $w_{1:n}$ based on (i) the task type label, (ii) an argument from the one or more arguments and (iii) the predicted task dependency label associated with each of the tasks present in the complex instruction to execute the intended task.

In another aspect, there is provided a system for robotic task planning for a complex instruction in natural language to execute an intended task, the system comprising: one or more data storage devices operatively coupled to one or more hardware processors and configured to store instructions configured for execution via the one or more hardware processors to: receive a set of tokens $I=\{w_1, w_2, \ldots w_n\}$ representative of tasks in an original task sequence $w_{1:n}$, present in the complex instruction and a set of task type labels $T=\{t_1, t_2, \ldots t_n\}$ in a task type label sequence $t_{1:m}$, wherein each of the tasks is associated with (i) a corresponding task type label in the set of task type labels T and (ii) one or more arguments that are grounded to objects, locations and states of the objects in an environment of a robot performing the tasks; predict, a set of task dependency labels $D=\{d_1, d_2, \ldots d_m\}$ in a task dependency label sequence $d_{1:m}$ corresponding to the task type label sequence $t_{1:m}$ using a pre-trained Conditional Random Field (CRF) model; and generate a Conditional Planning Tree (CPT) with a resolved task sequence by modifying the original task sequence $w_{1:n}$ based on (i) the task type label, (ii) an argument from the one or more arguments and (iii) the predicted task dependency label associated with each of the tasks present in the complex instruction to execute the intended task.

In yet another aspect, there is provided a computer program product comprising a non-transitory computer readable medium having a computer readable program embodied therein, wherein the computer readable program, when executed on a computing device, causes the computing device to: receive a set of tokens $I=\{w_1, w_2, \ldots w_n\}$ representative of tasks in an original task sequence $w_{1:n}$, present in the complex instruction and a set of task type labels $T=\{t_1, t_2, \ldots t_n\}$ in a task type label sequence $t_{1:m}$, wherein each of the tasks is associated with (i) a corresponding task type label in the set of task type labels T and (ii) one or more arguments that are grounded to objects, locations and states of the objects in an environment of a robot performing the tasks; predict, a set of task dependency labels $D=\{d_1, d_2, \ldots d_m\}$ in a task dependency label sequence $d_{1:m}$ corresponding to the task type label sequence $t_{1:m}$ using a pre-trained Conditional Random Field (CRF) model; and generate a Conditional Planning Tree (CPT) with a resolved task sequence by modifying the original task sequence $w_{1:n}$ based on (i) the task type label, (ii) an argument from the one or more arguments and (iii) the predicted task dependency label associated with each of the tasks present in the complex instruction to execute the intended task.

In accordance with an embodiment of the present disclosure, the task dependency label is one of conditional, dependent-positive, dependent-negative and sequential, wherein (i) the conditional label is indicative of a task having one or more dependent tasks, (ii) the dependent-positive label is indicative of a task that needs to be executed if a preceding task labeled as the conditional task yields a desired outcome, (iii) the dependent-negative label is indicative of a task that needs to be executed if the preceding task labeled as the conditional task yields an undesired outcome, and (iv) the sequential label is indicative of a task that is not explicitly dependent upon another task and an order of execution corresponds to a position of the task in the original task sequence $w_{1:n}$.

In accordance with an embodiment of the present disclosure, the one or more hardware processors are configured to input the generated CPT to a task planner to initiate the robotic task planning, wherein the robotic task planning starts from a root node in the CPT and terminates at a leaf node in the CPT, and wherein the robotic task planning continues to a task associated with a left child node or a right child node depending on an outcome at a decision point every time a middle child node representative of the decision point is encountered, and wherein each node in the CPT represents a task from the original task sequence $w_{1:n}$.

In accordance with an embodiment of the present disclosure, the one or more hardware processors are configured to predict a set of task dependency labels by: extracting one or more features associated with each of the tokens in the original task sequence $w_{1:n}$ using a feature function, estimating a conditional probability of the task dependency label sequence $d_{1:m}$ based on the task type label sequence $t_{1:m}$ and the original task sequence $w_{1:n}$; and classifying each of the task type labels with a task dependency label based on the estimated conditional probability of a task dependency label sequence $d_{1:m}$.

In accordance with an embodiment of the present disclosure, the one or more features include (i) pos indicative of parts of speech tag of the token, (ii) dep indicative of dependency relation from an associated parent in the CPT, (iii) has_mark indicative of a true condition if the token has a child marking a subordinate clause, (iv) advmod_child indicative of an adverbial modifier of the token, (v) has_advel_child indicative of a true condition if there is an adverbial clause modifier as a child, and (vi) task_type indicative of a task type label associated with the token.

In accordance with an embodiment of the present disclosure, the one or more hardware processors are configured to estimate a conditional probability of a task dependency label sequence $d_{1:m}$ is according to the equation
$P(d_{1:m}|t_{1:m},w_{1:n})=\alpha \exp\{\Sigma_{i=0}^{m}\Sigma_{j=0}^{k}\lambda_{j}f_{j}(w_{1:n},t_{i},d_{i-1},d_{i})\}$,
wherein $\alpha$ is a normalization factor, $f_j$ is a $j^{th}$ feature function for extracting value of the one or more features, $\lambda_j$ is weight of the $j^{th}$ feature function obtained from the pre-trained CRF model, and k is number of feature functions, and wherein each feature function $f_j$ is based on the original task sequence $w_{1:n}$, the task type label $t_i$ and two consecutive task dependency labels corresponding to the $i^{th}$ task type label.

In accordance with an embodiment of the present disclosure, the one or more hardware processors are configured to generate a CPT with a resolved task sequence by modifying the original task sequence $w_{1:n}$ such that (i) a dependent task on a predecessor task is scheduled in a required order agnostic of a position of the dependent task in the original task sequence $w_{1:n}$, and (ii) repeated tasks in the complex instruction are masked.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Existing works in robotic task planning assume either a single task instruction is given to the robot at a time or there are multiple independent or serialized tasks in an instruction. In many cases, the instructions are imposed with constraints on the space of linguistic variations, ambiguity or complexity of the language. In a practical scenario, there may be a task order dependency among the tasks, i.e., the tasks may have to be executed in a certain order or there may be an execution dependency, i.e., execution of a task may depend on the outcome of another task.

For example, in a simple instruction "pick the pen and bring it to me", the robot has to first perform a picking task, followed by a bringing task. However, the execution of a task may be dependent upon a condition or the outcome of another task. For example, in the instruction "if the coffee is hot, then bring it to me, otherwise put it on the oven", both the task of bringing the coffee and the task of putting the coffee on the oven is dependent upon the state of the coffee, i.e., whether it is hot. Moreover, the assumption that the tasks are to be performed in their order of appearance in the instruction, may not hold. For example, in the instruction "Bring me a pen if you find one on the table", the robot has to find a pen first, before attempting to bring it, although the bringing task appears in the instruction earlier. Understanding such dependencies between tasks becomes even more difficult when the dependency spans across multiple sentences. A work disclosed in Chinese Patent document CN106705974 entitled "Semantic role tagging and semantic extracting method of unrestricted path natural language"

provides a method for parsing natural language navigational instruction (only one kind of task, i.e moving) to a syntactic (grammatical) dependency tree using a CRF model and then converting it to a robot plan. Although multiple tasks in the same instruction are considered, all the tasks are of the same type (moving), only arguments are different, and there is neither any ordering dependency (their tasks are executed in the order as they appear), nor any execution dependency (all tasks are executed). Another work entitled "*Interactive Language-Based Task Library Instruction and Management for Single and Multiple Robots*" by Steven D. Klee in 2015 considers conditional dependency between tasks, however the work is limited to constrained language and hence is based on keyword-based matching to build control flow graphs. Also, it is presumed that the tasks provided in the instruction is required to be executed in the order provided, which may not necessarily be true in a practical scenario as explained in an exemplary instruction above.

Applicant has addressed the problem of identifying robotic task in natural language wherein mixed-initiative dialogue is employed to resolve ambiguities and address the dynamic nature of a typical conversation in Application No. 201921041305 entitled "*Conversational Systems And Methods For Robotic Task Identification Using Natural Language*" dated 11 Oct. 2019. However, the systems and methods of the Application No. 201921041305 can only handle multiple tasks that are independent or serialized. The present disclosure deals with complex task instructions defined in the context of the present disclosure as instructions in natural language composed of multiple interdependent tasks directed towards executing an intended task. It may be understood that the interdependent tasks are sub-tasks of the intended task.

Figure 1:
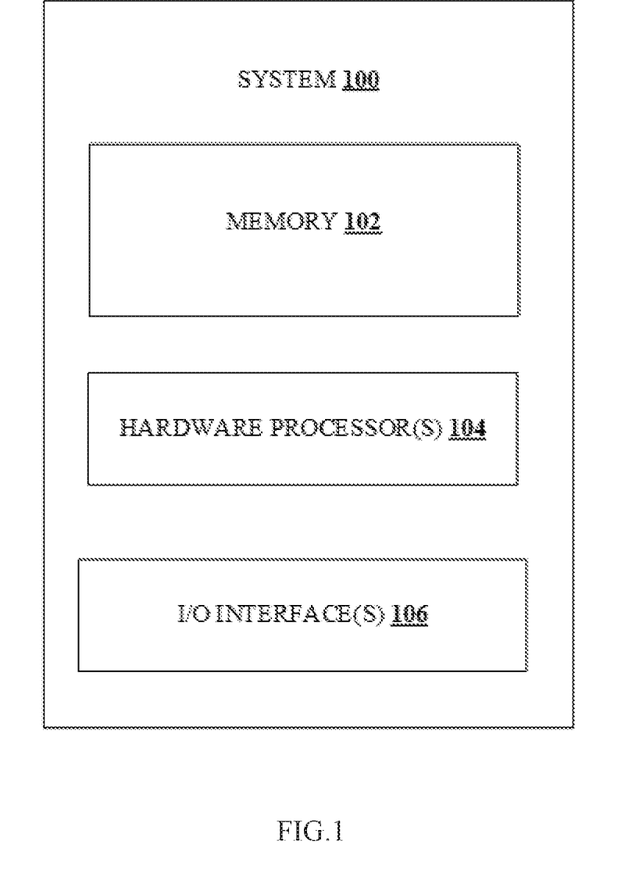
FIG. 1 illustrates an exemplary block diagram of a system for robotic task planning for a complex instruction in natural language to execute an intended task, in accordance with some embodiments of the present disclosure.
Figure 2:
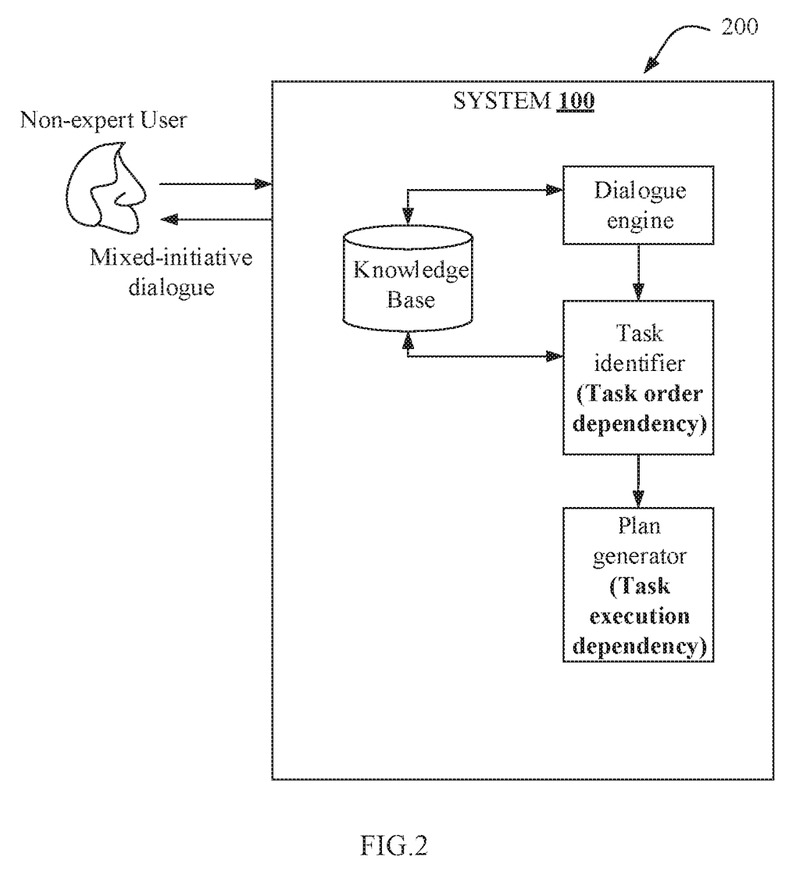
FIG. 2 illustrates a functional block diagram for the system of FIG. 1, in accordance with some embodiments of the present disclosure.
Figure 3:
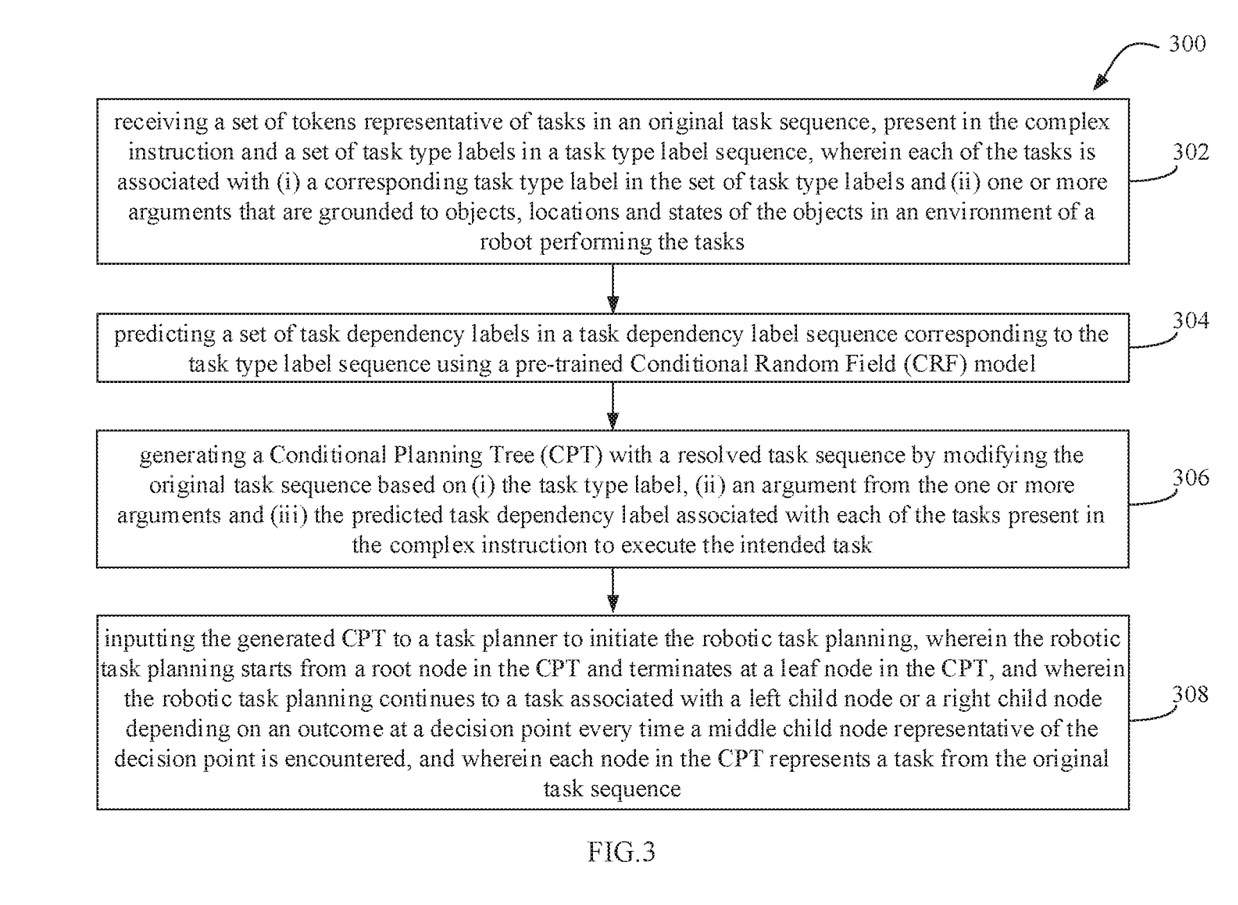
FIG. 3 illustrates an exemplary flow diagram of a computer implemented method for robotic task planning for a complex instruction in natural language to execute an intended task, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates an exemplary block diagram of a system 100 for robotic task planning for a complex instruction in natural language to execute an intended task, in accordance with some embodiments of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

FIG. 2 illustrates a functional block diagram 200 for the system of FIG. 1 while FIG. 3 illustrates an exemplary flow diagram of a computer implemented method 300 for robotic task planning for a complex instruction in natural language to execute an intended task, in accordance with some embodiments of the present disclosure. Although the description in the present disclosure is directed to a complex task instruction in particular, it may be understood that a simple instruction may also be processed by the functional block diagram 200. Hereinafter, the expressions 'complex instruction' and 'instruction' may be used interchangeable. In an embodiment, the system 100 includes one or more data storage devices or memory 102 operatively coupled to the one or more processors 104 and is configured to store instructions configured for execution of steps of the method 300 by the one or more processors 104. The steps of the method 300 will now be explained in detail with reference to the components of the system 100 of FIG. 1 and the functional block diagram of FIG. 2 for the same. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

As shown in FIG. 2, in an embodiment of the present disclosure, the functional blocks, at a high level, mainly include the one or more hardware processors 104 configured to form a Dialogue engine, a Task identifier and a Plan generator and a Knowledge Base comprised in the one or more data storage devices (102 of FIG. 1). For setting the context for the input to the system 100 of the present disclosure, some aspects provided in the Applicant's Application No. 20192104130 are referenced herein. However, other state of the art systems and methods configured to provide tasks and task type label sequences may provide inputs to the system 100 of the present disclosure. As explained in the in the Applicant's Application No. 20192104130, in an embodiment, the Dialogue engine is configured to handle bidirectional interaction (mixed-initiative dialogue) between the robot and the human (possibly a non-expert user). In the context of the present disclosure, the expressions 'human', 'user', 'non-expert user' may be used interchangeably. The Dialogue engine comprises a set of generic NLP tools that extract features from an utterance received from the human. Relevant questions are formulated for the user to resolve ambiguity in task understanding. If a human says, "Take the book from the table", the NLP tools process it to provide the following output consisting of grammatical features.

(Take, VB, root), (the, DT, det), (book, NN, dobj), (from, IN, prep), (the, DT, det), (table, NN, probj).

The Task identifier is configured to identify an intended task and relevant arguments from the interaction. To remove ambiguity and to understand semantic information provided by the NLP tools, a common vocabulary has to be agreed upon by the robot and the human. Even though the human provides the instruction in natural language, the same is converted to an intermediate representation (with uncertainty) that the robot can store and process. Frame Semantics theory is used to achieve the task modeling. The Frame Semantics model an event in the physical world as a frame, which completely describes the event using participating entities called frame elements. For instance, an event of taking an object from a location is modeled with a taking frame. To describe the event, the frame elements theme and source are used, where theme represents the object affected by the event and source represents a location where the theme is present. Thus, when the output of the NLP tool is processed by the task identifier, it produces the following output.

[Take]$_{taking}$ [the book]$_{theme}$[from the table]$_{source}$.

A multiclass classifier is used to identify the frame and the frame elements. If the classifier fails to substantiate with sufficient confidence, the human is asked relevant questions to resolve the ambiguity and missing information.

The Plan generator is configured to ensure a context aware input is generated for a task planner for the identified task. One-to-one mapping may not be possible between a human intended task and the primitive actions supported by the robot, because a high-level task goal may require performing a sequence of sub-tasks. To enable task, a state of a world model (current state of a robot and its environment) is exposed to the robot in terms of grounded fluents, which are logical predicates that may have variables as arguments. A task starts from an initial state of the world model and leads to a different state of the world model, namely a goal state.

Further, as explained in the Application No. 20192104130, the world model represents a current state of the world or environment where the robot is operating. A model of the robot is characterized by the robot's capabilities (e.g. picking) and constraints (e.g. can pick 10 kg). In accordance with the present disclosure, the model of the robot, the world model, task templates for plan generation and pre-defined response templates (used when an identified intent in a conversation is a greeting, statement, general query pertaining to the current state of the robot or its environment) are comprised in the Knowledge Base. The task template is context based and consists of pre-conditions and post-conditions to be satisfied for executing the task. The pre-conditions and post-conditions may vary significantly with the number of conditions and task context. In an embodiment, the Knowledge Base is comprised in the one or more data storage devices 102. The Knowledge Base is crucial to the intelligence the robot derives for making context sensitive conversation and hence effective task identification based on the conversation, wherein the context sensitive capabilities are based on at least the model of the robot and the world model.

In accordance with the present disclosure, the Task identifier is further configured to resolve task order dependency and the Plan generator is further configured to resolve task execution dependency as highlighted in bold text in FIG. 2 as explained hereinafter. In accordance with an embodiment of the present disclosure, the one or more processors 104, are configured to receive, at step 302, a set of tokens I={$w_1$, $w_2$, . . . $w_n$} representative of tasks in an original task sequence $w_{1:n}$, present in the complex instruction and a set of task type labels T={$t_1$, $t_2$, . . . $t_n$} in a task type label sequence $t_{1:m}$. As mentioned earlier, the tasks and the task type labels may be received from the systems disclosed by the Applicant in Application No. 20192104130 or any other state of the art systems. The tasks are assumed to be valid tasks (not greeting, statement, general query) identified from a conversation. For instance, the tasks may include bringing, searching, motion, placing, taking, change_operational_state, check_state and the like. The task check_state is an exemplary task that is not considered in conventional approaches including the Applicants' Application No. 20192104130. In accordance with the present disclosure, each of the tasks is associated with (i) a corresponding task type label in the set of task type labels T and (ii) one or more arguments that are grounded to objects, locations and states of the objects in an environment of a robot performing the tasks. The one or more arguments may include Theme, Phenomenon, Ground, Goal, Beneficiary, Source, Device, Object, State, Operational_state, Location and the like. The arguments Object and State are exemplary arguments that are not considered in conventional approaches including the Applicants' Application No. 20192104130. In an exemplary complex task instruction "if the coffee is hot, bring it to me", the received set of tokens is {if-O, the-O, coffee-O, is-check_state, hot-O, bring-bringing, it-O, to-O, me-O. Using the sequence of tokens labeled with task types, the arguments are labeled with IOB tags for each token of the text that denotes whether the token is inside (I), outside (O) or at the beginning (B) of a label. For the example provided, the token sequence is labeled as {if-O, the-B-Object, coffee-I-Object, is-O, hot-B-State, bring-O, it-B-Object, to-B-Goal, me-I-Goal}. A co-reference resolved may be used to replace anaphoric references using pronouns such as it, them, etc. with the corresponding arguments (nouns) of preceding tasks.

If there are multiple tasks identified in an instruction, dependencies between the tasks are resolved by predicting if the execution of a task is dependent on the execution of another task and if so, the nature of the dependency is estimated. The order dependency prediction and execution dependency estimation are jointly modeled as a sequence labeling problem by predicting task dependency labels for a sequence of predicted tasks. Accordingly, in an embodiment of the present disclosure, the one or more processors 104, are configured to predict, at step 304, a set of task dependency labels D={$d_1$, $d_2$, . . . $d_m$} in a task dependency label sequence $d_{1:m}$ corresponding to the task type label sequence $t_{1:m}$ using a pre-trained Conditional Random Field (CRF) model. Accordingly, each task type label in the set of task type labels is associated with a corresponding task dependency label in the set of task dependency labels D. The CRF model is a discriminative model for text sequence labeling and is configured to use lexical and grammatical features in the instruction, wherein the lexical features may include a word, lemma of the word and words of the left and right context, and wherein the grammatical features may include parts of speech and syntactic dependency of the word and context words. In an embodiment, a linear chain CRF model may be used.

In accordance with an embodiment of the present disclosure, the task dependency label is one of conditional, dependent-positive, dependent-negative and sequential, wherein (i) the conditional label is indicative of a task having one or more dependent tasks, (ii) the dependent-positive label is indicative of a task that needs to be executed if a preceding task labeled as the conditional task yields a desired outcome, (iii) the dependent-negative label is indicative of a task that needs to be executed if the preceding task labeled as the conditional task yields an undesired outcome, and (iv) the sequential label is indicative of a task that is not explicitly dependent upon another task and an order of execution corresponds to a position of the task in the original task sequence $w_{1:n}$. As an example, the token labeled with tasks in the instruction "if the coffee is hot, bring it to me", the task dependency labels are {is-check_state-conditional, bring-bringing-dependent_positive}.

It may be noted that difficulty in understanding dependencies between tasks arise from several intricacies of natural language that may be categorize into three types as explained hereinafter. A first category is related to unmarked dependency. A task is said to have a marked dependency when there is a lexical element (a word or a phrase) preceding the verb that determines the task's dependency label. For example, consider the instruction, "if you find a pen, then bring it to me". Here both the task of searching for a pen and the task of bringing are marked by the word if in the sub-ordinate clause and the word then in the main clause respectively. On the other hand, in the instruction: "If you can't find it on the table, look in the cupboard", although the first searching task in the sub-ordinate clause has a marked dependency, the second (searching) task in the independent clause has no lexical element that can determine its dependency. In other words, if the independent clause "look in the cupboard" is inspected separately, the task seems to have no dependency at all, which makes its prediction non-trivial.

A second category is related to out of order appearance. A prerequisite (if task T1 is dependent on task T2, then T2 is a prerequisite of T1) is usually followed by one or more dependent tasks and this correlation is useful for building rules for understanding task dependencies. However, it is also natural to convey a dependent task, followed by a conditional prerequisite. As an example, consider the instruction "Bring me a pen, if you find one on the table." where the bringing task is dependent on finding it first, but the prerequisite is stated later. Furthermore, such out of order, dependent tasks usually have unmarked dependencies that are difficult to predict.

A third category is related to implicit dependency. A task is said to have an explicit dependency if all of its dependent tasks appear in the same sentence. If the prerequisite of a task appears in a different sentence, it is referred to as an implicit dependency. For example, in the instruction: "Turn on the TV. If you can't, bring me the remote.", the task of bringing in the second sentence is dependent upon a task in the first. Implicit dependencies are difficult to predict because the prerequisites usually have unmarked dependencies that are difficult to predict. Also, as the tasks appear in different sentences, syntactic relations between the two tasks can't be found, which is otherwise useful for the prediction.

In accordance with an embodiment of the present disclosure, the step 304 of predicting a set of task dependency labels comprises firstly extracting one or more features associated with each of the tokens in the original task sequence $w_{1:n}$ using a feature function. In an embodiment, the features are extracted using a generic NLP library, Spacy (https://spacy.io/).

Then a conditional probability of the task dependency label sequence $d_{1:m}$ is estimated based on the task type label sequence $t_{1:m}$, the original task sequence $w_{1:n}$. Each of the task type labels are then classified with a task dependency label based on the estimated conditional probability of a task dependency label sequence $d_{1:m}$.

In accordance with an embodiment of the present disclosure, the one or more features include (i) pos indicative of parts of speech tag of the token, (ii) dep indicative of dependency relation from an associated parent in the CPT, (iii) has_mark indicative of a true condition if the token has a child marking a subordinate clause, (iv) advmod_child indicative of an adverbial modifier of the token, (v) has_advcl_child indicative of a true condition if there is an adverbial clause modifier as a child, and (vi) task_type indicative of a task type label associated with the token.

For the exemplary instruction "if the coffee is hot, bring it to me", for the tokens is and bring, the following features are extracted: is:
{'pos': 'VBZ', 'dep': 'advcl', 'has_mark': True, 'advmod_child': 'Null', 'has_advcl_child': False, 'task_type': 'check_state'}
bring:
{'pos': 'VB', 'dep': 'ROOT', 'has_mark': False, 'advmod_child': 'Null', 'has_advcl_child': True, 'task_type': 'Bringing'}

In accordance with an embodiment of the present disclosure, the step of estimating a conditional probability of a task dependency label sequence $d_{1:m}$ is according to the equation $$P(d_{1:m}|t_{1:m},w_{1:n})=\alpha \exp\{\Sigma_{i=0}^{m}\Sigma_{j=0}^{k}\lambda_j f_j(w_{1:n},t_i,d_{i-1},d_i)\}$$

wherein $\alpha$ is a normalization factor (for the probability to sum to 1), $f_j$ is a $j^{th}$ feature function for extracting value of the one or more features, $\lambda_j$ is weight of the $j^{th}$ feature function obtained from the pre-trained CRF model, and k is number of feature functions, and wherein each feature function $f_j$ is based on the original task sequence $w_{1:n}$, the task type label $t_i$ and two consecutive task dependency labels corresponding to the $i^{th}$ task type label.

Accordingly, for exemplary instruction "if the coffee is hot, bring it to me", for the tokens is and bring, using the weights learned from the pre-trained CRF model, the following task dependency labels are identified:
"if the coffee is (Check_state) hot, bring (Bringing) it to me" becomes:
{is-check state-conditional, bring-bringing-dependent_positive}

In accordance with the present disclosure, to generalize the CRF model for out-of-vocabulary words, words are not included as features. Rather, the grammatical structures are exploited. The feature functions also include transition features that estimate the probability of a label, given the estimated probability of the preceding label. The transition features help the prediction of an implicit dependency, as the parse trees corresponding to the subsequent labels are disjoint, giving no evidence of the grammatical relation.

To execute a task, a robot needs to perform a sequence of basic actions or tasks supported by its motion and manipulation capabilities. A task plan is a sequence of such actions that satisfies the intended task or goal. A task specified in an instruction is considered to change a hypothetical state of the world (initial state) to an expected state (goal state). The initial and goal conditions of a task are encoded as a conjunction of fluents expressed in first-order logic. The task templates are grounded using the predicted task dependency labels at step 304 to generate a planning problem in a Planning Domain Definition Language (PDDL) format.

During the grounding of the templates, assumed initial conditions for a task are updated by the post conditions of the actions of a previous sequential task. In the case of conditionals, a plan is generated for each conditional-dependent pair, and in run-time, the correct action sequence is chosen from the actual observed outcome of the conditional task. Therefore, the problem of generating a robotic task plan for the complex instruction is reduced to the ordering of the tasks catering to the execution dependencies, followed by planning individually for the goals of the tasks in order while validating the assumed initial states by the action post conditions.

Accordingly, in an embodiment of the present disclosure, the one or more processors 104, are configured to generate, at step 306, a Conditional Planning Tree (CPT) with a resolved task sequence by modifying the original task sequence $w_{1:n}$ based on (i) the task type label, (ii) an argument from the one or more arguments and (iii) the predicted task dependency label associated with each of the tasks present in the complex instruction to execute the intended task.

In accordance with an embodiment of the present disclosure, the step 306 of generating a CPT with a resolved task sequence comprises modifying the original task sequence $w_{1:n}$. The modification of the original task sequence $w_{1:n}$ ensures that a conditional task is planned before any of its dependent tasks agnostic of a position of the dependent task in the original task sequence $w_{1:n}$. In case of multiple conditional tasks in the same instruction, it is assumed that two such conditional tasks indicate the same conditional task, if the two tasks have the same task type. If so, it is ensured that the dependent tasks of the subsequent conditionals are planned after the original conditional task. Repeated tasks (different words meaning the same task may be identified based on the pre-condition template and the post-condition template for the tasks from the Knowledge Base) are masked. If a subsequent conditional task is of a different type, its subsequent tasks that have either dependent positive and dependent negative labels are considered to be actually dependent, i.e to be planned after the conditional perquisite. For tasks having a sequential dependency label, they are ordered as per their corresponding positions in the instruction.

In accordance with an embodiment of the present disclosure, the one or more processors 104, are configured to input, at step 308, the generated CPT to a task planner to initiate the robotic task planning, wherein the robotic task planning starts from a root node in the CPT and terminates at a leaf node 10 in the CPT, and wherein the robotic task planning continues to a task associated with a left child node or a right child node depending on an outcome at a decision point every time a middle child node representative of the decision point is encountered, and wherein each node in the CPT represents a task from the original task sequence $w_{1:n}$.

In an embodiment, the pseudo-code for generating the CPT is as follows:

Input: a list of tasks, each task is annotated with the task type label, one or more arguments (argument types and corresponding values) and task dependency labels.

Output: A Conditional Planning Tree (CPT), an n-ary tree (3-ary in an exemplary embodiment) where each node represents a task to be planned, left and right branches represent conditional execution and middle branches represent sequential execution and a path from the root node to any leaf node is one of the possible plans for the given instruction.

For an instruction, "Go to the kitchen and if the coffee is hot, then bring it to me, otherwise put it on the oven", the root node of the CPT is Moving(kitchen),the middle child node is (Check_state(coffee, hot), the left child node is (Bringing (coffee, me) and the right child node is (Placing(coffee, oven).

```
Algorithm:
1.  Initialize CPT as empty tree, buffer B as empty list
2.  For each current_task in task_list do:
      a)  If dependency_label(current_task) == 'sequential' then,
            i.  If CPT is empty then,
                   Make current_task the root node
                Else,
                   Append current_task as the middle child of last added node
      b)  Else if dependency_label(current_task) == 'conditional' then,
            i.   last_conditional=last added conditional node
            ii.  merge_and_append(currenf_fask, last_conditional, CPT)
            iii. If B is not empty then,
                    1.  For each pending_task in B do,
                          a)  If    dependency_label(pending_task)    ==
                              'dependent_positive' then,
                                i.  add_left(pending_task,CPT)
                          b)  Else  if  dependency_label(pending_task)   ==
                              'dependent_negative' then,
                                i.  add_right(pending_task,CPT)
      c)  Else if dependency_label(current_task) == 'dependent_positive' then,
            i.   last_conditional=last added conditional node
            ii.  If last_conditional == Null then,
                    1.  Add current_task to B
            iii. Else
                    1.  add_left(current_task,CPT)
      d)  Else                                              // only
          dependent_negative remains
            i.   last_conditional=last added conditional node
            ii.  If last_conditional == Null then,
                    1.  Add current_task to B
            iii. Else
                    1.  add_right(current_task,CPT)
Function add_left(task, CPT):
1.  If left subtree of last node is empty then,
      a)  Create new left subtree
      b)  Add task as left child of last node
2.  Else
      a)  Add task as middle child in current left subtree
```

```
Function add_right(task, CPT):
1.  If right subtree of last node is empty then,
    a)  Create new right subtree
    b)  Add task as right child of last node
2.  Else
    a)  Add task as middle child in current right subtree
Function merge_and_append (current_task, last conditional, CPT):
1.  If      type(current_task)    ==    type(last_conditional)    and
    can_merge(current_task, last_conditional) == True,
    a)  Merge current_task with last_conditional
    b)  Add arguments of current_task to last_conditional
2.  Else
    a)  Append current_task as the middle child of last_conditional
Function can_merge (task1, task2):
1.  If type(task1) == type(task2):
    a)  arg_dictionary1= arguments of task1
    b)  arg_dictionary2= arguments of task2
    c)  For each argument_type1, value1 in arg_dictionary1:
        i.  For each argument_type2, value2 in arg_dictionary2:
            1.  If argument_type1 == argument_type2 and value1 != value2
                a)  Return False
    d)  Return True
2.  Else
    a)  Return False
```

EVALUATION

The performance of the system and method of the present disclosure, in accordance with two embodiments, was measured for task dependency prediction and compared with a baseline (state of the art). The end-to-end system performance of finding the required sequence of post-conditions to be given to the planner, starting from a natural language instruction was also measured.

Dataset: The task identification and argument identification CRF models of a system in accordance with the Applicant's Application No. 201921041305 was trained with the HuRlc corpus provided by E. Bastianelli et al. in *Proceedings of the Ninth International Conference on Language Resources and Evaluation* after appending 22 annotated samples of the task type check_state of the present disclosure. For annotating the task dependency labels, 65 samples of conditional instructions were created and 16 samples of instructions containing multiple sequential tasks from the HuRlc corpus were collected. 81 instructions were annotated, each containing multiple tasks and 2.86 tasks per instruction on an average (standard deviation=1.03). The instructions were annotated with the tasks, the arguments corresponding to the tasks, the dependency labels and the correct ordering of goals of the tasks for an end-to-end evaluation.

Performance of the systems and methods of the present disclosure in resolving task dependency: The dataset (HuRlc corpus) was randomly split into 70% training data and 30% test data. The systems of the present disclosure, Model 1 (considering the features provided above except the task_type feature) and Model 2 (considering all the features provided above) were compared with a rule-based baseline model to predict conditional and dependent tasks. The baseline model uses a set of rules described by D. K. Misra et al. in *Proceedings of the 53rd Annual Meeting of the Association of Computational Linguistics and the 7th International Joint Conference on Natural Language Processing* in 2015 to predict the conditional and the dependent tasks and a default predicts the label sequential, if none of the rules apply. The three Models were training using the training data and the accuracy metrics are as provided in the Table I below.

TABLE 1

Comparison of the three Models for task dependency label prediction.

| Task dependency label | Model | Precision | Recall | F1 |
|---|---|---|---|---|
| conditional | Baseline | 0.79 | 0.76 | 0.78 |
| | Model 1 | 0.89 | 0.96 | 0.92 |
| | Model 2 | 0.96 | 0.96 | 0.96 |
| dependent-positive | Baseline | 0.50 | 0.06 | 0.10 |
| | Model 1 | 0.89 | 0.89 | 0.89 |
| | Model 2 | 1.00 | 0.89 | 0.94 |
| dependent-negative | Baseline | 1.00 | 0.59 | 0.74 |
| | Model 1 | 0.94 | 0.88 | 0.91 |
| | Model 2 | 0.94 | 1.00 | 0.97 |
| sequential | Baseline | 0.32 | 0.92 | 0.48 |
| | Model 1 | 0.92 | 0.85 | 0.88 |
| | Model 2 | 0.86 | 0.92 | 0.89 |
| Class-weighted average | Baseline | 0.69 | 0.58 | 0.55 |
| | Model 1 | 0.91 | 0.90 | 0.90 |
| | Model 2 | 0.95 | 0.95 | 0.95 |

The baseline model achieves a F1-score of 0.55, as it can't predict the dependency labels accurately for out-of-order tasks and implicit dependencies. Specifically, the baseline model suffers from poor precision and recall for the dependent positive label. Also, as the baseline marks a task by the default label sequential if none of the rules are applicable, its prediction has a low precision but high recall. In comparison, the Model 1 that doesn't use the task_type feature, outperforms the baseline by a large margin, $\delta F1=+0.35$. This is because the Model 1 of the present disclosure uses both syntactical relations and transition features to predict the unmarked, implicit and out-of-order dependencies. For example, the transition features estimate high likelihoods of the subsequent task of a conditional to have a positive or negative dependent label, while estimating low likelihoods for a subsequent task to have the sequential label. This is revealed by the learnt weights of the transition features, that are shown in Table II below.

TABLE II

Weights of the transition features learnt by the
CRF model. The value and sign of the weights can
be used to interpret transition probabilities.

| Previous prediction | conditional | dependent-negative | dependent-positive | sequential |
|---|---|---|---|---|
| Conditional | 0.285 | 2.584 | 3.264 | −0.564 |
| dependent-positive | 0.565 | 2.340 | 0.933 | −1.054 |
| dependent-negative | −1.9777 | −1.103 | −1.068 | −1.522 |
| sequential | −1.315 | −1.262 | −0.680 | 1.624 |

Using the task_type feature further improves the performance of the CRF model, showing δF1=+0.05 overall improvement over the CRF model (Model 1) that doesn't use this feature. This is because Model 2 associates high probabilities of the conditional label with certain types of tasks that are often used to express a conditional task, such as searching and check_state. Even if this co-relation of a task and its dependency type does not hold in some robotics domain, still the Model 1 of the present disclosure that does not use the task_type feature can be used that has an acceptable accuracy.

End-to-end performance: The end-to-end performance of the Models of the present disclosure were evaluated to find the intended order of planning of tasks from a natural language complex task instruction using two metrics. Firstly, the number of exact matches between ordering of the tasks provided by the Models of the present disclosure and the corresponding annotated ground truth were calculated. For the task identification evaluation, the CRF models of the present disclosure were used in the three variants of the Baseline model, Model 1 and Model 2 since the Baseline model of the art does not predict task types. The ground truth of the intended task sequence uses the ground truth of the task type labeling as well. As the trained task identifier is probabilistic, its error propagates to the dependency resolver, i.e. the predicted order of tasks can deviate from the ground truth even if one single task is mis-predicted, even though the mis-predicted task may be sequential. So, a less pessimistic metric called the Ordering Error Rate (OER) is introduced. The OER is defined as the number of Substitutions (S), Deletion (D) and Insertion (I) operations performed on the predicted task ordering to produce the ground truth, divided by the number of tasks in the ground truth, i.e. for a ground truth ordering of N tasks, $$OER = \frac{S + D + I}{N}$$

The percentage of exact match and OER for all the instructions are calculated to obtain the end-to-end evaluation results as shown in Table III below.

TABLE III

Comparison of accuracy in finding the intended order
of tasks usingexact match and OER metrics.

| Model | Exact March | Ordering Error Rate |
|---|---|---|
| Baseline | 22% | 0.57 |
| Model 1 | 62% | 0.16 |
| Model 2 | 66% | 0.14 |

It is noted that the baseline model performs poorly as it can only find the exact sequence of the intended tasks 22% of the time. A 40% improvement in performance is noted by using the Model 1 of the present disclosure without using the task_type feature. The Model of the present disclosure finds an exact match 66% of the time, thereby outperforming the baseline model by a large margin.

Analyzing the failure cases, it was noted that the decline in end-to-end performance from the individual accuracy of the task dependency resolver is mainly attributed to the errors made during task identification, whose mis-prediction of a single task leads to an in-exact match. By analyzing the results of the OER metric, it was noted that task ordering predicted by the Model 2 of the present disclosure is very similar to the ground truth ordering (OER=0.14), whereas for the baseline mode, the predicted task ordering largely differ from the ground truth (OER=0.57), even though it uses the same task identification model.

Providing instructions to a robot through natural language conversation adds to the usability of the robot and convenience for the user. The instructions are often provided as a complex phrase, especially when neither the user nor the robot has a full view of the environment. Existing work often assumes simple task instructions with a single task or multiple independent tasks. However, when multiple tasks are present in such a complex instruction, it includes situations where the execution of certain tasks are dependent on the outcome of another. Most of the time, such an interdependency between tasks is not stated explicitly, which makes its prediction a challenging task. The present disclosure provides systems and methods that understand such dependencies between tasks and re-order the tasks catering to their dependency types. A probabilistic model with features facilitates predicting the dependencies with high accuracy. After finding the required order of task execution, each task is planned in the required order, while conditionally planning the dependent tasks. The evaluation provided herein above compares the Models of the present disclosure with a Baseline model designed based on the present disclosure and it is noted that the Models of the present disclosure significantly outperform the Baseline model.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for robotic task planning for a complex instruction in natural language to execute an intended task, the method comprising the steps of:

receiving, via one or more hardware processors, a set of tokens I=$\{w_1, w_2, \ldots w_n\}$ representative of tasks in an original task sequence $w_{1:n}$, present in the complex instruction and a set of task type labels T=$\{t_1, t_2, \ldots t_n\}$ in a task type label sequence $t_{1:m}$, wherein each of the tasks is associated with (i) a corresponding task type label in the set of task type labels T and (ii) one or more arguments that are grounded to objects, locations and states of the objects in an environment of a robot performing the tasks;

predicting, via the one or more hardware processors, a set of task dependency labels D=$\{d_1, d_2, \ldots d_m\}$ in a task dependency label sequence $d_{1:m}$ corresponding to the task type label sequence $t_{1:m}$ using a pre-trained Conditional Random Field (CRF) model, wherein the task dependency label is one of conditional, dependent-positive, dependent-negative and sequential, wherein (i) the conditional label is indicative of a task having one or more dependent tasks, (ii) the dependent-positive label is indicative of a task that needs to be executed if a preceding task labeled as the conditional task yields a desired outcome, (iii) the dependent-negative label is indicative of a task that needs to be executed if the preceding task labeled as the conditional task yields an undesired outcome, and (iv) the sequential label is indicative of a task that is not explicitly dependent upon another task and an order of execution corresponds to a position of the task in the original task sequence $w_{1:n}$;

grounding, via the one or more hardware processors, task templates using the predicted set of task dependency labels to generate a planning problem in a Planning Domain Definition Language (PDDL) format, wherein during the grounding of the task templates, assumed initial conditions for a task are updated by post conditions of actions of a previous sequential task, and wherein if the predicted task dependency label is the conditional, then a plan is generated for a conditional-dependent pair, and in run-time, a correct action sequence is chosen from actual observed outcome of the conditional task; and generating, via the one or more hardware processors, a Conditional Planning Tree (CPT) with a resolved task sequence by modifying the original task sequence $w_{1:n}$ based on (i) the task type label, (ii) an argument from the one or more arguments and (iii) the predicted task dependency label associated with each of the tasks present in the complex instruction to execute the intended task.

2. The processor implemented method of claim 1, further comprising a step of inputting, via the one or more hardware processors, the generated CPT to a task planner to initiate the robotic task planning, wherein the robotic task planning starts from a root node in the CPT and terminates at a leaf node in the CPT, wherein the robotic task planning continues to a task associated with a left child node or a right child node depending on an outcome at a decision point every time a middle child node representative of the decision point is encountered, and wherein each node in the CPT represents a task from the original task sequence $w_{1:n}$, and wherein the generated CPT is an n-ary tree, where each node in the CPT represents the task from the original task sequence $w_{1:n}$, left and right branches represent conditional execution and middle branches represent sequential execution.

3. The processor implemented method of claim 1, wherein the step of predicting a set of task dependency labels comprises:

extracting one or more features associated with each of the tokens in the original task sequence $w_{1:n}$ using a feature function;

estimating a conditional probability of the task dependency label sequence $d_{1:m}$ based on the task type label sequence $t_{1:m}$ and the original task sequence $w_{1:n}$ using the feature function including transition features that estimate the conditional probability of the task dependency label, given estimated conditional probability of a preceding task dependency label; and classifying each of the task type labels with a task dependency label based on the estimated conditional probability of a task dependency label sequence $d_{1:m}$.

4. The processor implemented method of claim 3, wherein the one or more features include (i) pos indicative of parts of speech tag of the token, (ii) dep indicative of dependency relation from an associated parent in the CPT, (iii) has_mark indicative of a true condition if the token has a child marking a subordinate clause, (iv) advmod_child indicative of an adverbial modifier of the token, (v) has_advel_child indicative of a true condition if there is an adverbial clause modifier as a child, and (vi) task_type indicative of a task type label associated with the token.

5. The processor implemented method of claim 3, wherein the step of estimating a conditional probability of a task dependency label sequence $d_{1:m}$ is according to the equation $$P(d_{1:m} \mid t_{1:m}, w_{1:n}) = \alpha \exp\left\{\sum_{i=0}^{m}\sum_{j=0}^{k} \lambda_j f_j(w_{1:n}, t_i, d_{i-1}, d_i)\right\}$$

wherein $\alpha$ is a normalization factor, $f_j$ is a $j^{th}$ feature function for extracting value of the one or more features, $\lambda_j$ is weight of the $j^{th}$ feature function obtained from the pre-trained CRF model, and k is number of feature functions, and wherein each feature function $f_j$ is based on the original task sequence $w_{1:n}$, the task type label $t_i$ and two consecutive task dependency labels corresponding to the $i^{th}$ task type label.

6. The processor implemented method of claim 1, wherein the step of generating a CPT with a resolved task sequence comprises modifying the original task sequence $w_{1:n}$ such that (i) a conditional task is planned before a dependent task agnostic of a position of the dependent task in the original task sequence $w_{1:n}$, (ii) for multiple conditional tasks in a same instruction, if conditional tasks indicate same conditional task having same task type, then dependent tasks of subsequent conditional tasks are planned after an original conditional task, and (iii) repeated tasks in the complex instruction are masked.

7. A system for robotic task planning for a complex instruction in natural language to execute an intended task, the system comprising:

one or more data storage devices operatively coupled to one or more hardware processors and configured to store instructions configured for execution via the one or more hardware processors to:

receive a set of tokens $I=\{w_1, w_2, \ldots w_n\}$ representative of tasks in an original task sequence $w_{1:n}$, present in the complex instruction and a set of task type labels $T=\{t_1, t_2, \ldots t_n\}$ in a task type label sequence $t_{1:m}$, wherein each of the tasks is associated with (i) a corresponding task type label in the set of task type labels T and (ii) one or more arguments that are grounded to objects, locations and states of the objects in an environment of a robot performing the tasks;

predict, a set of task dependency labels $D=\{d_1, d_2, \ldots d_m\}$ in a task dependency label sequence $d_{1:m}$ corresponding to the task type label sequence $t_{1:m}$ using a pre-trained Conditional Random Field (CRF) model, wherein the task dependency label is one of conditional, dependent-positive, dependent-negative and sequential, wherein (i) the conditional label is indicative of a task having one or more dependent tasks, (ii) the dependent-positive label is indicative of a task that needs to be executed if a preceding task labeled as the conditional task yields a desired outcome, (iii) the dependent-negative label is indicative of a task that needs to be executed if the preceding task labeled as the conditional task yields an undesired outcome, and (iv) the sequential label is indicative of a task that is not explicitly dependent upon another task and an order of execution corresponds to a position of the task in the original task sequence $w_{1:n}$;

ground task templates using the predicted set of task dependency labels to generate a planning problem in a Planning Domain Definition Language (PDDL) format, wherein during the grounding of the task templates, assumed initial conditions for a task are updated by post conditions of actions of a previous sequential task, and wherein if the predicted task dependency label is the conditional, then a plan is generated for a conditional-dependent pair, and in run-time, a correct action sequence is chosen from actual observed outcome of the conditional task; and generate a Conditional Planning Tree (CPT) with a resolved task sequence by modifying the original task sequence $w_{1:n}$ based on (i) the task type label, (ii) an argument from the one or more arguments and (iii) the predicted task dependency label associated with each of the tasks present in the complex instruction to execute the intended task.

8. The system of claim 7, wherein the one or more processors are further configured to input the generated CPT to a task planner to initiate the robotic task planning, wherein the robotic task planning starts from a root node in the CPT and terminates at a leaf node in the CPT, wherein the robotic task planning continues to a task associated with a left child node or a right child node depending on an outcome at a decision point every time a middle child node representative of the decision point is encountered, and wherein each node in the CPT represents a task from the original task sequence $w_{1:n}$, and wherein the generated CPT is an n-ary tree, where each node in the CPT represents the task from the original task sequence $w_{1:n}$, left and right branches represent conditional execution and middle branches represent sequential execution.

9. The system of claim 7, wherein the one or more processors are further configured to predict a set of task dependency labels by:

extracting one or more features associated with each of the tokens in the original task sequence $w_{1:n}$ using a feature function;

estimating a conditional probability of the task dependency label sequence $d_{1:m}$ based on the task type label sequence $t_{1:m}$ and the original task sequence $w_{1:n}$ using the feature function including transition features that estimate the conditional probability of the task dependency label, given estimated conditional probability of a preceding task dependency label; and classifying each of the task type labels with a task dependency label based on the estimated conditional probability of a task dependency label sequence $d_{1:m}$.

10. The system of claim 9, wherein the one or more features include (i) pos indicative of parts of speech tag of the token, (ii) dep indicative of dependency relation from an associated parent in the CPT, (iii) has_mark indicative of a true condition if the token has a child marking a subordinate clause, (iv) advmod_child indicative of an adverbial modifier of the token, (v) has_advcl_child indicative of a true condition if there is an adverbial clause modifier as a child, and (vi) task_type indicative of a task type label associated with the token.

11. The system of claim 9, wherein the one or more processors are further configured to estimate a conditional probability of a task dependency label sequence $d_{1:m}$ is according to the equation $$P(d_{1:m} \mid t_{1:m}, w_{1:n}) = \alpha \exp\left\{\sum_{i=0}^{m}\sum_{j=0}^{k} \lambda_j f_j(w_{1:n}, t_i, d_{i-1}, d_i)\right\}$$

wherein $\alpha$ is a normalization factor, $f_j$ is a $j^{th}$ feature function for extracting value of the one or more features, $\lambda_j$ is weight of the $j^{th}$ feature function obtained from the pre-trained CRF model, and k is number of feature functions, and wherein each feature function $f_j$ is based on the original task sequence $w_{1:n}$, the task type label $t_i$ and two consecutive task dependency labels corresponding to the $i^{th}$ task type label.

12. The system of claim 11, wherein the one or more processors are further configured to generate a CPT with a resolved task sequence by modifying the original task sequence $w_{1:n}$ such that (i) a conditional task is planned before a dependent task agnostic of a position of the dependent task in the original task sequence $w_{1:n}$, (ii) for multiple conditional tasks in a same instruction, if conditional tasks indicate same conditional task having same task type, then dependent tasks of subsequent conditional tasks are planned after an original conditional task, and (iii) repeated tasks in the complex instruction are masked.

13. A computer program product comprising a non-transitory computer readable medium having a computer readable program embodied therein, wherein the computer readable program, when executed on a computing device, causes the computing device to:
  receive a set of tokens $I=\{w_1, w_2, \ldots w_n\}$ representative of tasks in an original task sequence $w_{1:n}$, present in the complex instruction and a set of task type labels $T=\{t_1, t_2, \ldots t_n\}$ in a task type label sequence $t_{1:m}$, wherein each of the tasks is associated with (i) a corresponding task type label in the set of task type labels T and (ii) one or more arguments that are grounded to objects, locations and states of the objects in an environment of a robot performing the tasks;
  predict, a set of task dependency labels $D=\{d_1, d_2, \ldots d_m\}$ in a task dependency label sequence $d_{1:m}$ corresponding to the task type label sequence $t_{1:m}$ using a pre-trained Conditional Random Field (CRF) model, wherein the task dependency label is one of conditional, dependent-positive, dependent-negative and sequential, wherein (i) the conditional label is indicative of a task having one or more dependent tasks, (ii) the dependent-positive label is indicative of a task that needs to be executed if a preceding task labeled as the conditional task yields a desired outcome, (iii) the dependent-negative label is indicative of a task that needs to be executed if the preceding task labeled as the conditional task yields an undesired outcome, and (iv) the sequential label is indicative of a task that is not explicitly dependent upon another task and an order of execution corresponds to a position of the task in the original task sequence $w_{1:n}$;
  grounding task templates using the predicted set of task dependency labels to generate a planning problem in a Planning Domain Definition Language (PDDL) format, wherein during the grounding of the task templates, assumed initial conditions for a task are updated by post conditions of actions of a previous sequential task, and wherein if the predicted task dependency label is the conditional, then a plan is generated for a conditional-dependent pair, and in run-time, a correct action sequence is chosen from actual observed outcome of the conditional task; and
  generate a Conditional Planning Tree (CPT) with a resolved task sequence by modifying the original task sequence $w_{1:n}$ based on (i) the task type label, (ii) an argument from the one or more arguments and (iii) the predicted task dependency label associated with each of the tasks present in the complex instruction to execute the intended task.

14. The computer program product of claim 13, wherein the computer readable program further causes the computing device to: input the generated CPT to a task planner to initiate the robotic task planning, wherein the robotic task planning starts from a root node in the CPT and terminates at a leaf node in the CPT, wherein the robotic task planning continues to a task associated with a left child node or a right child node depending on an outcome at a decision point every time a middle child node representative of the decision point is encountered, and wherein each node in the CPT represents a task from the original task sequence $w_{1:n}$, and wherein the generated CPT is an n-ary tree, where each node in the CPT represents the task from the original task sequence $w_{1:n}$, left and right branches represent conditional execution and middle branches represent sequential execution.

* * * * *